(12) United States Patent
Lisch et al.

(10) Patent No.: US 9,254,604 B2
(45) Date of Patent: Feb. 9, 2016

(54) CONTROLLED BASE FLASH FORMING A STANDING RING

(71) Applicant: Amcor Limited, Hawthorn, Victoria (AU)

(72) Inventors: George David Lisch, Jackson, MI (US); Terry D. Patcheak, Ypsilanti, MI (US); Kirk Edward Maki, Tecumseh, MI (US); Christopher Howe, Belleville, MI (US)

(73) Assignee: Amcor Limited, Hawthorn, Victoria (AU)

( * ) Notice: Subject to any disclaimer, the term of this patent is extended or adjusted under 35 U.S.C. 154(b) by 0 days.

(21) Appl. No.: 14/242,457

(22) Filed: Apr. 1, 2014

(65) Prior Publication Data

US 2014/0212537 A1 Jul. 31, 2014

Related U.S. Application Data

(62) Division of application No. 13/181,659, filed on Jul. 13, 2011, now abandoned.

(60) Provisional application No. 61/364,827, filed on Jul. 16, 2010.

(51) Int. Cl.
  *B29C 49/48* (2006.01)
  *B29C 49/54* (2006.01)
  *B65D 1/02* (2006.01)
  (Continued)

(52) U.S. Cl.
  CPC .............. *B29C 49/54* (2013.01); *B65D 1/0276* (2013.01); *B65D 79/005* (2013.01); *B29C 49/04* (2013.01); *B29C 49/06* (2013.01); *B29C 49/12* (2013.01); *B29C 49/4802* (2013.01); *B29C 2049/4807* (2013.01); *B29C 2049/622* (2013.01); *B29K 2023/065* (2013.01); *B29K 2023/12* (2013.01); *B29K 2067/003* (2013.01); *B29L 2031/7158* (2013.01); *B65D 2501/0036* (2013.01)

(58) Field of Classification Search
  CPC .................. B29C 2049/4807; B29C 49/4802; B29C 2049/622; B29C 49/54
  USPC ........................................................ 425/525
  See application file for complete search history.

(56) References Cited

U.S. PATENT DOCUMENTS

| 166,350 A | 8/1875 | Dodge |
| 1,048,411 A | 12/1912 | Hutchins |

(Continued)

FOREIGN PATENT DOCUMENTS

| FR | 1441727 A | * 5/1966 |
| JP | H03100788 U | 10/1991 |

(Continued)

*Primary Examiner* — Robert B Davis
(74) *Attorney, Agent, or Firm* — Harness, Dickey & Pierce, PLC

(57) ABSTRACT

A mold for forming a plastic container having an integrally formed standing ring. The mold includes a first mold portion and a second mold portion. The second mold portion is movable relative to the first mold portion. The first mold portion and the second mold portion together define at least in part a mold cavity for molding a plastic container. The first mold portion and the second mold portion together define a standing ring slot for forming a standing ring on a base portion of the plastic container. The standing ring slot is defined at an interface between the first mold portion and the second mold portion.

23 Claims, 12 Drawing Sheets

(51) Int. Cl.
*B65D 79/00* (2006.01)
*B29C 49/04* (2006.01)
*B29C 49/06* (2006.01)
*B29C 49/12* (2006.01)
*B29C 49/62* (2006.01)
*B29K 23/00* (2006.01)
*B29K 67/00* (2006.01)
*B29L 31/00* (2006.01)

(56) References Cited

U.S. PATENT DOCUMENTS

| | | | |
|---|---|---|---|
| 1,048,935 A | 12/1912 | Brady | |
| 1,464,548 A | 8/1923 | Stephens | |
| 1,482,425 A | 2/1924 | Ziony | |
| 1,583,083 A | 5/1926 | Macaraig | |
| 1,744,947 A | 1/1930 | Bowman | |
| 1,759,274 A | 5/1930 | O'Brien | |
| 1,778,175 A | 10/1930 | Thune | |
| 2,129,119 A | 9/1938 | Davis | |
| 2,438,434 A | 3/1948 | Friedman | |
| 2,610,489 A | 9/1952 | Clemensen | |
| 2,685,316 A | 8/1954 | Krasno | |
| 2,725,087 A | 11/1955 | Potter | |
| 2,834,502 A | 5/1958 | Trojan | |
| 2,880,902 A | 4/1959 | Owsen | |
| 2,886,084 A | 5/1959 | Davison | |
| 2,889,110 A | 6/1959 | Johnson et al. | |
| 2,899,110 A | 8/1959 | Parker | |
| 2,905,351 A | 9/1959 | Lerner | |
| 2,997,199 A | 8/1961 | Reachi | |
| 3,050,773 A * | 8/1962 | Hagen | 264/534 |
| 3,079,037 A | 2/1963 | Schechter | |
| 3,155,281 A | 11/1964 | Stracey | |
| 3,217,915 A | 11/1965 | Weygandt | |
| 3,220,544 A | 11/1965 | Lovell | |
| 3,285,459 A | 11/1966 | Gahm | |
| 3,369,687 A | 2/1968 | Walls | |
| 3,409,167 A | 11/1968 | Blanchard | |
| 3,568,878 A | 3/1971 | Fotos | |
| 3,873,003 A | 3/1975 | Seiferth et al. | |
| 3,939,887 A | 2/1976 | Scarnato | |
| 3,939,888 A | 2/1976 | Scarnato | |
| 3,949,034 A | 4/1976 | Uhlig | |
| 3,955,705 A | 5/1976 | Dubois et al. | |
| 3,956,441 A | 5/1976 | Uhlig | |
| 4,047,329 A | 9/1977 | Holt | |
| 4,228,122 A | 10/1980 | Hammes | |
| 4,377,191 A | 3/1983 | Yamaguchi | |
| 4,378,328 A | 3/1983 | Przytulla et al. | |
| 4,489,847 A | 12/1984 | Ames | |
| 4,492,313 A | 1/1985 | Touzani | |
| 4,574,969 A | 3/1986 | Mays | |
| 4,643,323 A | 2/1987 | Schutz | |
| 4,713,207 A * | 12/1987 | Udell et al. | 264/515 |
| 4,836,398 A | 6/1989 | Leftault, Jr. et al. | |
| 4,955,493 A | 9/1990 | Touzani | |
| 4,967,538 A | 11/1990 | Leftault, Jr. et al. | |
| 5,037,010 A | 8/1991 | Dikstein | |
| 5,067,622 A | 11/1991 | Garver et al. | |
| 5,209,372 A | 5/1993 | Norwood | |
| 5,266,551 A | 11/1993 | Bailey et al. | |
| 5,310,068 A | 5/1994 | Saghri | |
| 5,341,946 A | 8/1994 | Vailliencourt et al. | |
| 5,348,173 A | 9/1994 | Norwood | |
| 5,482,178 A | 1/1996 | Cohu | |
| 5,543,107 A | 8/1996 | Malik et al. | |
| 5,573,129 A | 11/1996 | Nagata et al. | |
| 5,584,413 A | 12/1996 | Jung | |
| 5,690,244 A | 11/1997 | Darr | |
| 5,713,480 A | 2/1998 | Petre et al. | |
| 5,758,789 A | 6/1998 | Shin et al. | |
| 5,799,792 A | 9/1998 | Abrums | |
| D403,587 S | 1/1999 | Thornley et al. | |
| 5,862,932 A | 1/1999 | Walsh et al. | |
| 5,908,128 A | 6/1999 | Krishnakumar et al. | |
| 5,971,184 A | 10/1999 | Krishnakumar et al. | |
| 6,065,624 A | 5/2000 | Steinke | |
| 6,230,912 B1 | 5/2001 | Rashid | |
| 6,277,321 B1 | 8/2001 | Vailliencourt et al. | |
| 6,413,466 B1 | 7/2002 | Boyd et al. | |
| 6,585,124 B2 | 7/2003 | Boyd et al. | |
| D483,225 S | 12/2003 | Gain | |
| 6,736,285 B2 | 5/2004 | Stewart-Stand | |
| 6,752,284 B1 | 6/2004 | Akiyama et al. | |
| 7,134,867 B2 * | 11/2006 | Jarman et al. | 425/525 |
| 7,273,147 B2 | 9/2007 | Willat et al. | |
| 7,568,369 B2 * | 8/2009 | Kubacki et al. | 425/525 |
| 7,574,846 B2 | 8/2009 | Sheets et al. | |
| D608,161 S | 1/2010 | Olivari | |
| 7,654,402 B2 | 2/2010 | Kusuma et al. | |
| 7,748,553 B2 | 7/2010 | Akiyama et al. | |
| 7,799,264 B2 | 9/2010 | Trude | |
| 7,866,500 B1 | 1/2011 | Peggs | |
| 7,900,425 B2 | 3/2011 | Bysick et al. | |
| 7,926,243 B2 | 4/2011 | Kelley et al. | |
| 8,011,166 B2 | 9/2011 | Sheets et al. | |
| 8,025,169 B2 | 9/2011 | Zimmerman | |
| 8,096,098 B2 | 1/2012 | Kelley et al. | |
| 8,171,701 B2 | 5/2012 | Kelley et al. | |
| 8,181,804 B2 | 5/2012 | Lane | |
| 8,205,749 B2 | 6/2012 | Korpanty et al. | |
| 8,353,415 B2 | 1/2013 | Saito et al. | |
| 8,429,880 B2 | 4/2013 | Kelley et al. | |
| 2003/0160055 A1 | 8/2003 | Stewart-Stand | |
| 2003/0183628 A1 | 10/2003 | Barr | |
| 2003/0221987 A1 | 12/2003 | Trude | |
| 2003/0230588 A1 | 12/2003 | Zepter | |
| 2004/0200799 A1 | 10/2004 | Yourist et al. | |
| 2004/0251258 A1 | 12/2004 | Akiyama et al. | |
| 2005/0127073 A1 | 6/2005 | Kusuma et al. | |
| 2005/0127074 A1 | 6/2005 | Kusuma et al. | |
| 2006/0016819 A1 | 1/2006 | Paslawski et al. | |
| 2006/0091102 A1 | 5/2006 | Bourque et al. | |
| 2006/0191945 A1 | 8/2006 | Kao | |
| 2007/0039918 A1 | 2/2007 | Lane et al. | |
| 2007/0181403 A1 | 8/2007 | Sheets et al. | |
| 2008/0047964 A1 | 2/2008 | Denner et al. | |
| 2008/0083696 A1 | 4/2008 | Nievierowski et al. | |
| 2008/0230462 A1 | 9/2008 | Curtin | |
| 2009/0000981 A1 | 1/2009 | So et al. | |
| 2009/0194546 A1 | 8/2009 | Lane | |
| 2009/0202766 A1 | 8/2009 | Beuerle et al. | |
| 2009/0218004 A1 | 9/2009 | Sheets et al. | |
| 2009/0283495 A1 | 11/2009 | Lane et al. | |
| 2009/0293436 A1 | 12/2009 | Miyazaki et al. | |
| 2010/0140279 A1 | 6/2010 | Tyson et al. | |
| 2011/0017700 A1 | 1/2011 | Patcheak et al. | |
| 2011/0089135 A1 | 4/2011 | Simon et al. | |
| 2011/0089195 A1 | 4/2011 | Penny et al. | |
| 2011/0217494 A1 | 9/2011 | Lane | |

FOREIGN PATENT DOCUMENTS

| | | |
|---|---|---|
| JP | H09254947 A | 9/1997 |
| JP | 2780367 B2 * | 7/1998 |

* cited by examiner

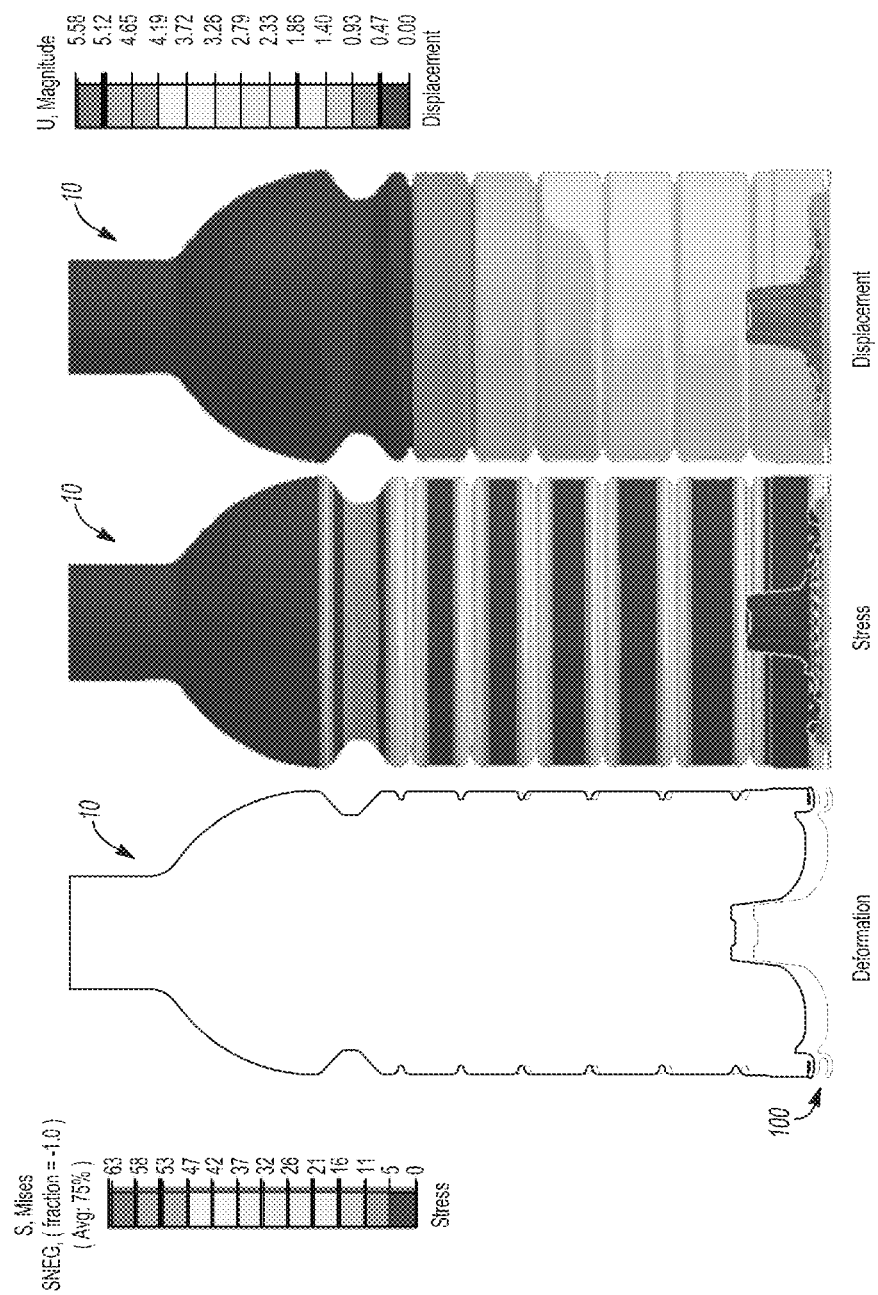

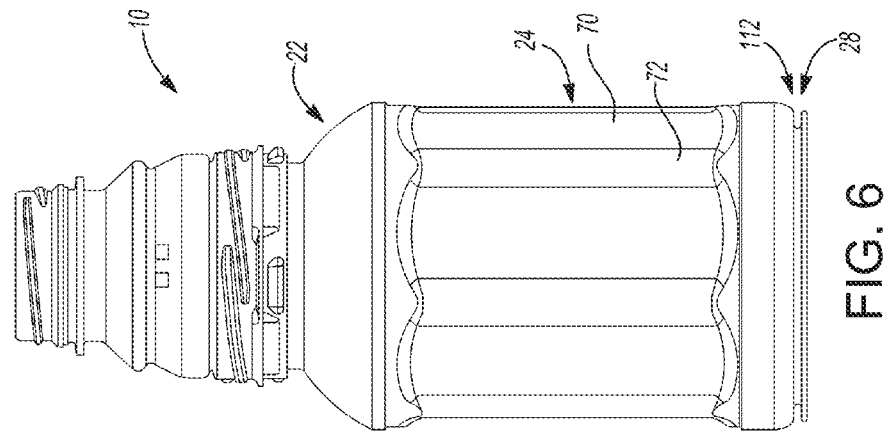
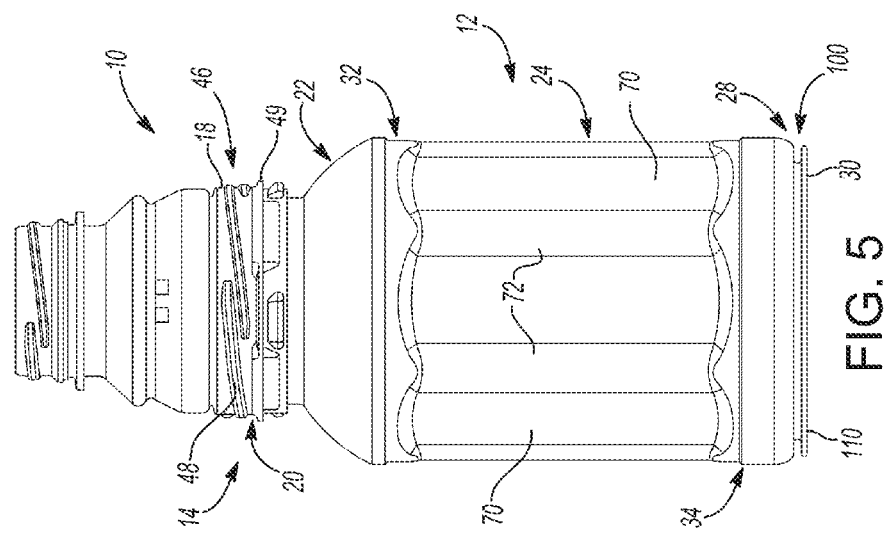

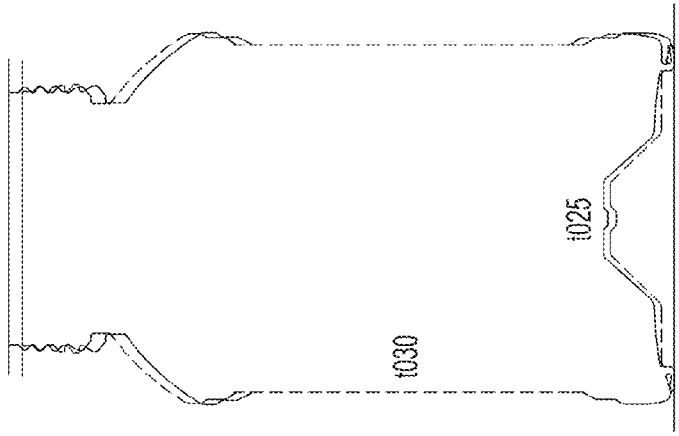
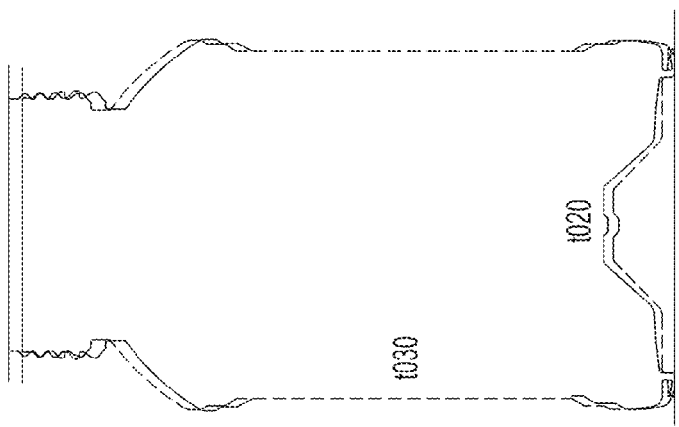
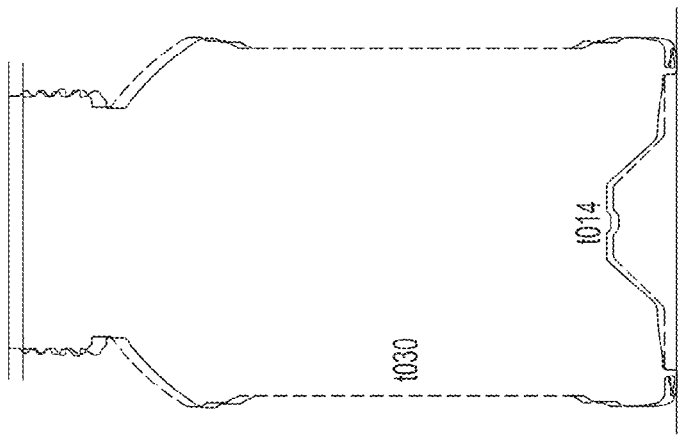
FIG. 9A  FIG. 9B  FIG. 9C  FIRST STAGE

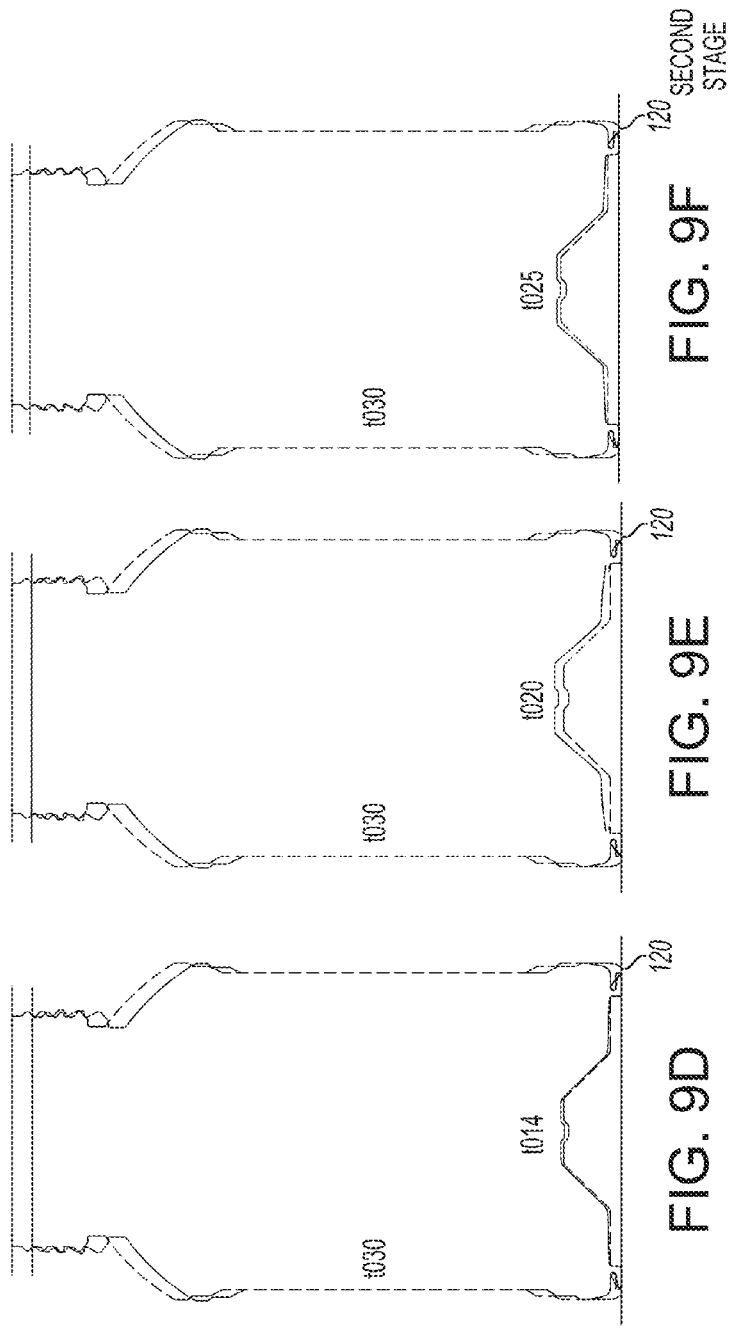

THIRD STAGE

CONTROLLED BASE FLASH FORMING A STANDING RING

CROSS-REFERENCE TO RELATED APPLICATIONS

This application is a divisional of U.S. patent application Ser. No. 13/181,659 filed on Jul. 13, 2011. This application claims the benefit of U.S. Provisional Application No. 61/364,827, filed on Jul. 16, 2010. The entire disclosures of the above applications are incorporated herein by reference.

FIELD

This disclosure generally relates to containers for retaining a commodity, such as a solid or liquid commodity. More specifically, this disclosure relates to a blown polyethylene terephthalate (PET) container having a flexible standing ring circumferentially surrounding its base for improved container performance and reduced container weight.

BACKGROUND

This section provides background information related to the present disclosure which is not necessarily prior art.

As a result of environmental and other concerns, plastic containers, more specifically polyester and even more specifically polyethylene terephthalate (PET) containers are now being used more than ever to package numerous commodities previously supplied in glass containers. Manufacturers and fillers, as well as consumers, have recognized that PET containers are lightweight, inexpensive, recyclable and manufacturable in large quantities.

Blow-molded plastic containers have become commonplace in packaging numerous commodities. PET is a crystallizable polymer, meaning that it is available in an amorphous form or a semi-crystalline form. The ability of a PET container to maintain its material integrity relates to the percentage of the PET container in crystalline form, also known as the "crystallinity" of the PET container. The following equation defines the percentage of crystallinity as a volume fraction:

$$\% \text{ Crystallinity} = \left(\frac{\rho - \rho_a}{\rho_c - \rho_a}\right) \times 100$$

where $\rho$ is the density of the PET material; $\rho_a$ is the density of pure amorphous PET material (1.333 g/cc); and $\rho_c$ is the density of pure crystalline material (1.455 g/cc).

Container manufacturers use mechanical processing and thermal processing to increase the PET polymer crystallinity of a container. Mechanical processing involves orienting the amorphous material to achieve strain hardening. This processing commonly involves stretching an injection molded PET preform along a longitudinal axis and expanding the PET preform along a transverse or radial axis to form a PET container. The combination promotes what manufacturers define as biaxial orientation of the molecular structure in the container. Manufacturers of PET containers currently use mechanical processing to produce PET containers having approximately 20% crystallinity in the container's sidewall.

Thermal processing involves heating the material (either amorphous or semi-crystalline) to promote crystal growth. On amorphous material, thermal processing of PET material results in a spherulitic morphology that interferes with the transmission of light. In other words, the resulting crystalline material is opaque, and thus, generally undesirable. Used after mechanical processing, however, thermal processing results in higher crystallinity and excellent clarity for those portions of the container having biaxial molecular orientation. The thermal processing of an oriented PET container, which is known as heat setting, typically includes blow molding a PET preform against a mold heated to a temperature of approximately 250° F.-350° F. (approximately 121° C.-177° C.), and holding the blown container against the heated mold for approximately two (2) to five (5) seconds. Manufacturers of PET juice bottles, which must be hot-filled at approximately 185° F. (85° C.), currently use heat setting to produce PET bottles having an overall crystallinity in the range of approximately 25%-35%.

SUMMARY

This section provides a general summary of the disclosure, and is not a comprehensive disclosure of its full scope or all of its features.

The present teachings provide for a mold for forming a plastic container having an integrally formed standing ring. The mold includes a first mold portion and a second mold portion. The second mold portion is movable relative to the first mold portion. The first mold portion and the second mold portion together define at least in part a mold cavity for molding a plastic container. The first mold portion and the second mold portion together define a standing ring slot for forming a standing ring on a base portion of the plastic container. The standing ring slot is defined at an interface between the first mold portion and the second mold portion.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3 is a schematic view of the container with portions in solid lines representing deformation of the container during a cool down response from 83° C. to 23° C. and portions in dashed lines representing the initial configuration;

FIG. 4A is a schematic view of the container illustrating localized stress concentrations during the cool down response;

FIG. 4B is a schematic view of the container illustrating localized displacement concentrations during the cool down response;

FIG. 5 is a front view of a plastic container constructed in accordance with the teachings of the present disclosure;

FIG. 6 is a side view of the plastic container of FIG. 5;

FIGS. 9A-9I are schematic views of the container with portions in dashed lines representing deformation of the container during a filled cap top load response wherein the sidewall thickness is t030 in each example and base thickness varies from t014, t020, to t025, respectively, arranged in sets of threes for each of the first stage, second stage, and third stage of deformation, respectively;

Corresponding reference numerals indicate corresponding parts throughout the several views of the drawings.

DETAILED DESCRIPTION

Figure 1:
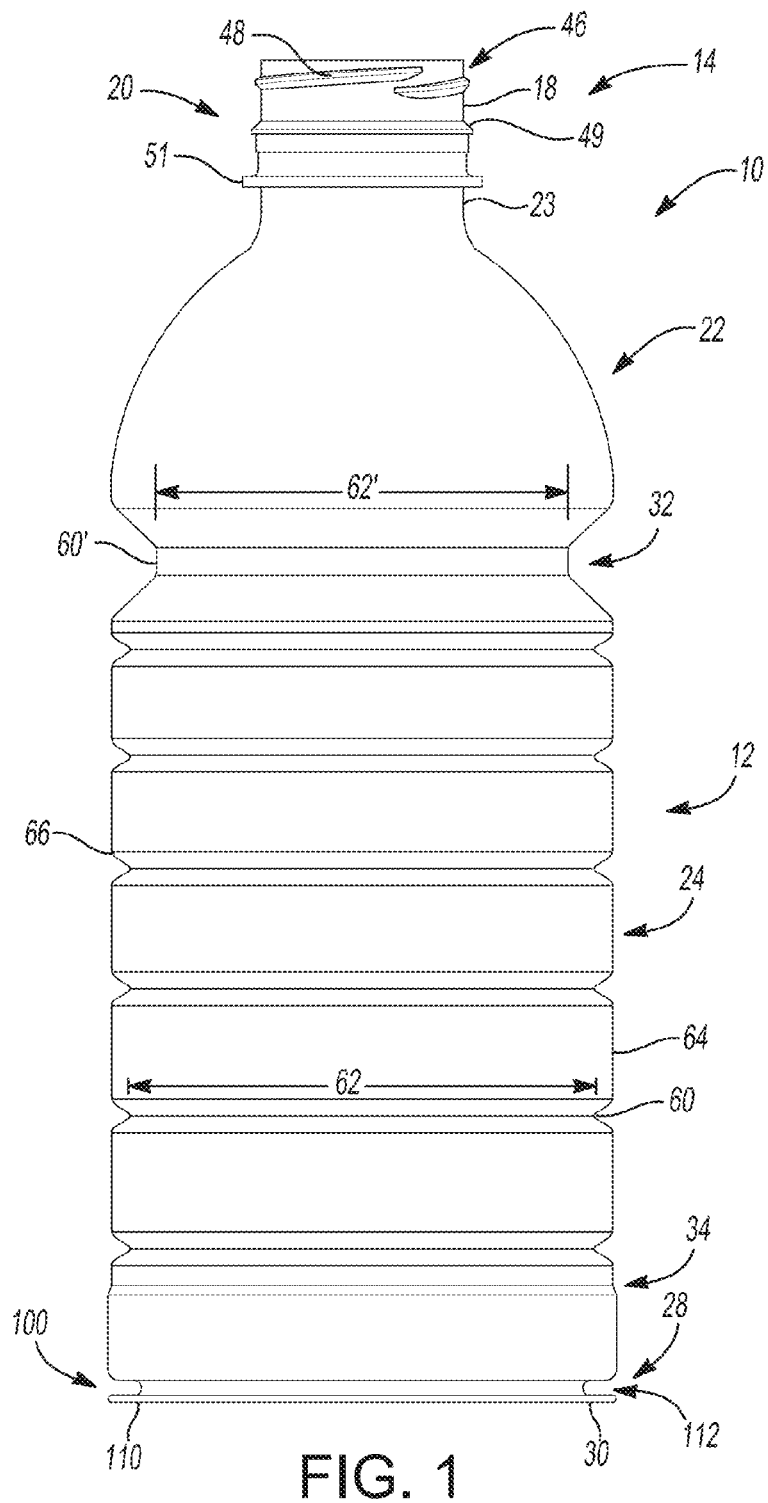
FIG. 1 is a side view of a plastic container constructed in accordance with the teachings of the present disclosure.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The present teachings provide for a container having a flexible standing ring that effectively absorbs the internal vacuum while maintaining its basic shape. The flexible standing ring can be described as having an integrated base fold that is flexible in the vertical direction (in a direction coaxial with a central axis A-A of the container (FIG. 2)) and rigid in a radial direction (in a direction orthogonal to the central axis A-A). The container of the present teachings, unlike conventional containers, provided increased vacuum performance thereby permitting thinner wall thicknesses and reduced material consumption to be realized.

As will be discussed in greater detail herein, the shape of the container of the present teachings can be formed according to any one of a number of variations. By way of non-limiting example, the container of the present disclosure can be configured to hold any one of a plurality of commodities, such as beverages, food, or other hot-fill type materials.

It should be appreciated that the size and the exact shape of the flexible standing ring are dependent on the size of the container and the required vacuum absorption. Therefore, it should be recognized that variations can exist in the presently described designs. According to some embodiments, it should also be recognized that the container can include additional vacuum absorbing features or regions, such as panels, ribs, slots, depressions, and the like.

As illustrated throughout the several figures, the present teachings provide a one-piece plastic, e.g. polyethylene terephthalate (PET), container generally indicated at 10. The container 10 comprises an integrated base fold flexible standing ring design according to the principles of the present teachings. Those of ordinary skill in the art would appreciate that the following teachings of the present disclosure are applicable to other containers, such as rectangular, triangular, hexagonal, octagonal or square shaped containers, which may have different dimensions and volume capacities. It is also contemplated that other modifications can be made depending on the specific application and environmental requirements.

As shown in FIGS. 1-6, the one-piece plastic container 10 according to the present teachings defines a body 12, and includes an upper portion 14 having a cylindrical sidewall 18 forming a finish 20. Integrally formed with the finish 20 and extending downward therefrom is a shoulder portion 22. The shoulder portion 22 merges into and provides a transition between the finish 20 and a sidewall portion 24. The sidewall portion 24 extends downward from the shoulder portion 22 to a base portion 28 having a base 30. An upper transition portion 32, in some embodiments, may be defined at a transition between the shoulder portion 22 and the sidewall portion 24. A lower transition portion 34, in some embodiments, may be defined at a transition between the base portion 28 and the sidewall portion 24.

The exemplary container 10 may also have a neck 23. The neck 23 may have an extremely short height, that is, becoming a short extension from the finish 20, or an elongated height, extending between the finish 20 and the shoulder portion 22. The upper portion 14 can define an opening. Although the container is shown as a drinking container (FIGS. 1-4B) and a food container (FIGS. 5-6), it should be appreciated that containers having different shapes, such as sidewalls and openings, can be made according to the principles of the present teachings.

As illustrated in FIGS. 1, 5 and 6, the finish 20 of the plastic container 10 may include a threaded region 46 having threads 48, a lower sealing ridge 49, and a support ring 51. The threaded region 46 provides a means for attachment of a similarly threaded closure or cap (not illustrated). Alternatives may include other suitable devices that engage the finish 20 of the plastic container 10, such as a press-fit or snap-fit cap for example. Accordingly, the closure or cap (not illustrated) engages the finish 20 to preferably provide a hermetical seal of the plastic container 10. The closure or cap (not illustrated) is preferably of a plastic or metal material conventional to the closure industry and suitable for subsequent thermal processing.

Referring now to FIGS. 1-4, sidewall portion 24 of the present teachings will now be described in greater detail. As discussed herein, sidewall portion 24 can comprise various vacuum features that effectively absorb at least a portion of the internal vacuum while maintaining the container's basic shape. In some embodiments, sidewall portion 24 can comprises one or more radially disposed vacuum ribs 60. To this end, vacuum ribs 60 can each comprise an inwardly directed rib member defining a reduced container diameter section 62 and a plurality of lands 64 disposed therebetween. Transition features or radiuses 66 can be disposed between vacuum ribs 60 and adjacent lands 64. Vacuum ribs 60 can be equidistantly spaced along sidewall portion 24. In response to internal vacuum, vacuum ribs 60 can articulate about reduced container diameter section 62 to achieve a vacuum absorbed posture. However, it should also be understood that vacuum ribs 60 can further provide a reinforcement feature to container 10, thereby providing improved structural integrity and stability.

Still referring to FIGS. 1-4, container 10 can further comprise an enlarged radially disposed vacuum rib 60' disposed along sidewall portion 24, shoulder portion 22, and/or upper transition portion 32. In this regard, enlarged vacuum rib 60' can comprise an inwardly directed rib member defining a reduced container diameter section 62'. Reduced diameter section 62' of vacuum rib 60' can define a container diameter that is smaller than the container diameter of reduced diameter section 62 of vacuum rib 60. Moreover, vacuum rib 60' can have a radiused curvature that is greater than vacuum rib 60 for increased vacuum performance.

With particular reference to FIGS. 5 and 6, in some embodiments, container 10 can comprise vertically oriented vacuum panels 70 having transition surface 72 disposed therebetween. Vacuum panels 70 can be generally equidistant spaced about sidewall portion 24. While such spacing is useful, other factors such as labeling requirements or the incorporation of grip features or graphics may require spacing other than equidistant. The container 10 illustrated in FIGS. 5 and 6 can comprise eight (8) vacuum panels 70. Lands, inclined columns, or transition surfaces 72 are defined between adjacent vacuum panels 70, which provide structural support and rigidity to sidewall portion 24 of container 10.

With particular reference to FIGS. 1-6, 8, and 9, container 10 further comprises a flexible standing ring 100 disposed radially about base 30 and a center pushup feature 50 disposed centrally along an underside of base 30. As described herein, flexible standing ring 100 can be an integrated base fold feature that provides a plurality of design advantages over convention prior art base designs. In some embodiments, flexible standing ring 100 provides 1) increased volume displacement compared to other vacuum absorbing features, 2) positive charge up while under filled and capped vertical loading conditions, 3) improved distributed forces along the base of the container during stacking, 4) rigid central base pushup, 5) improved individual container stacking capability (closure fits within base), and 6) securing shrink wrap label.

Figure 2:
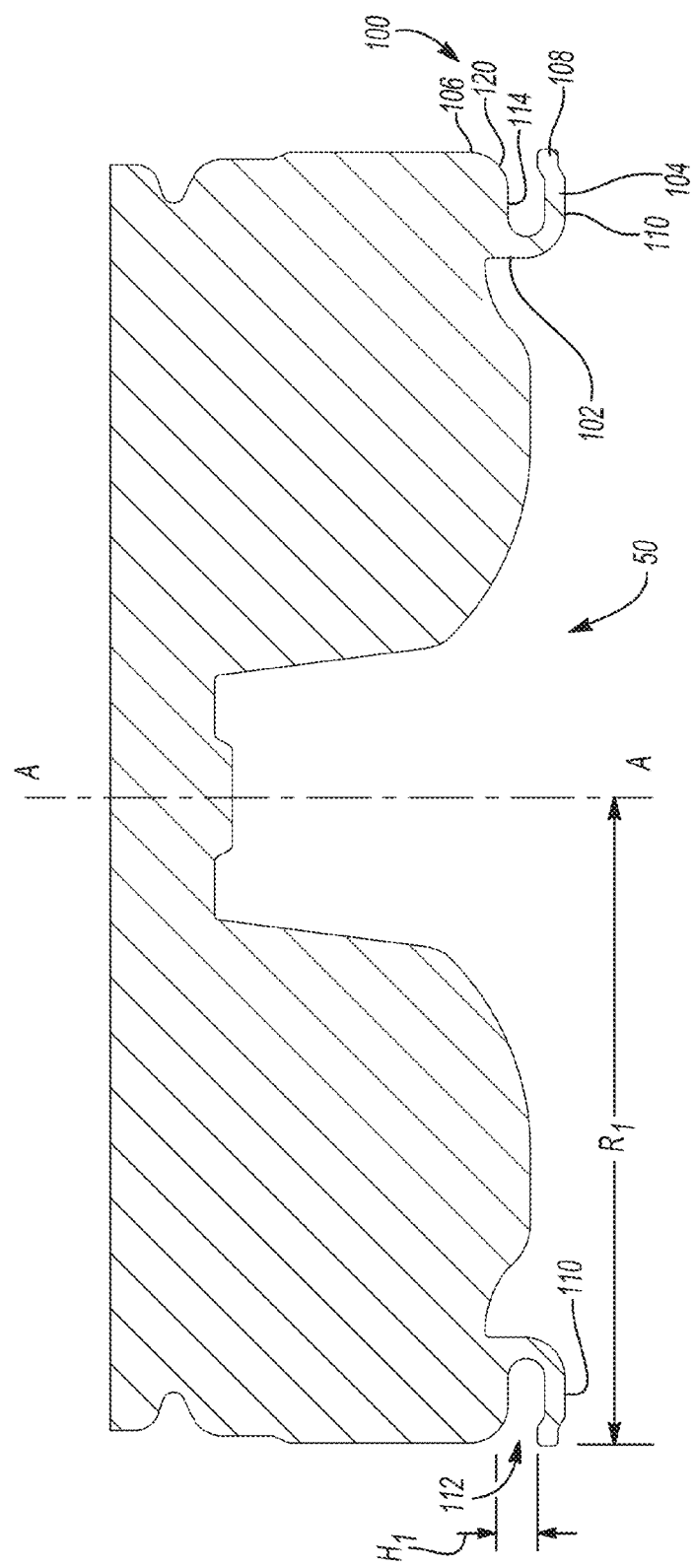
FIG. 2 is an enlarged cross-sectional view of the base portion of the container of FIG. 1.

With particular reference to FIG. 2, flexible standing ring 100 can comprise a leg portion 102 extending downwardly from base portion 28 that terminates at an outwardly directed foot portion 104. Leg portion 102 can downwardly extend from base portion 28 at a position generally adjacent and inset from a land 106. The amount of the inset of leg portion 102 can be dependent on the vacuum absorption that is desired. Foot portion 104 can extend outwardly from a terminal end of leg portion 102. In some embodiments, foot portion 104 can be positioned orthogonal to leg portion 102. However, in some embodiments, leg portion 102 and foot portion 104 can have any one of a number of relative orientations conducive with container performance.

In some embodiments, foot portion 104 extends radially outwardly such that a distal portion or toe portion 108 is radially aligned with an overall shape or dimension of sidewall portion 24 and/or base portion 28 (as shown in FIGS. 1 and 2). However, in some embodiments, toe portion 108 of foot portion 104 can extend less than an overall shape or dimension of sidewall portion 24 and/or base portion 28 (as shown in FIGS. 5 and 6) or greater than (not shown). In this regard, an underside surface 110 of foot portion 104 forms a standing ring that provides a contact surface between container 10 and any support structure thereunder. The described structure of flexible standing ring 100 thus provides an annular groove or slot 112 formed about the base of container 10. The depth, height, and cross-sectional shape of annular groove 112 can be varied depending on structural, vacuum, and aesthetic characteristics; however, it should be appreciated that flexible standing ring 100 provides a means to accommodate internal vacuum forces in container 10 while minimizing or at least decreasing overall container weight.

Flexible standing ring 100 can be characterized, in some embodiments, as an assembly having a downwardly and outwardly ring member. This arrangement results in an annular groove disposed above the ring member. The ring member further includes a lower surface that contacts the support structure, such as counter, packaging material, display shelf, and the like, and thus is located along a base portion of the container. It should be appreciated that variations of the present design of flexible standing ring 100 exist.

With particular reference to FIGS. 3, 4A, and 4B, cool down response of container 10, and in particular flexible standing ring 100, will now be described in detail. As seen in FIG. 3, cool down response of container 10 can comprise a collapse or deformation of container 10 and flexible standing ring 100 in response to internal vacuum forces. To this extent, as illustrated by the solid lines in FIG. 3, flexible standing ring 100 collapses in such a way that foot portion 104 is permitted to articulate upward and, in some embodiments, against an underside surface 114 (FIG. 2) of base portion 28, thereby closing annular slot 112. The amount of deflection of foot portion 104 may vary depending on size of container, wall thickness of material, amount of internal vacuum pressure, and the like. However, contact of foot portion 104 with underside surface 114 of base portion 28 can lead to a second stage of load response of container 10.

With reference to FIGS. 2 and 3, it should also be appreciated that the cool down response of container 10 can further include collapse or at least narrowing of the thickness of foot portion 104 and/or leg portion 102. In this way, opposing walls of foot portion 104 and/or leg portion 102 are forced together in response to vacuum forces. This narrowing response further aids in permitting articulations and collapse of flexible standing ring 100 as illustrated in FIG. 3.

With reference to FIGS. 4A and 4B, it can be seen that in response to internal vacuum forces, container 10 exhibits localized stresses in predetermined locations consistent with predictable and manageable collapse of container 10. Moreover, actual displacement of container 10 can be localized to a lower section of sidewall portion 24 and base portion 28 (including flexible standing ring 100).

Figure 7:
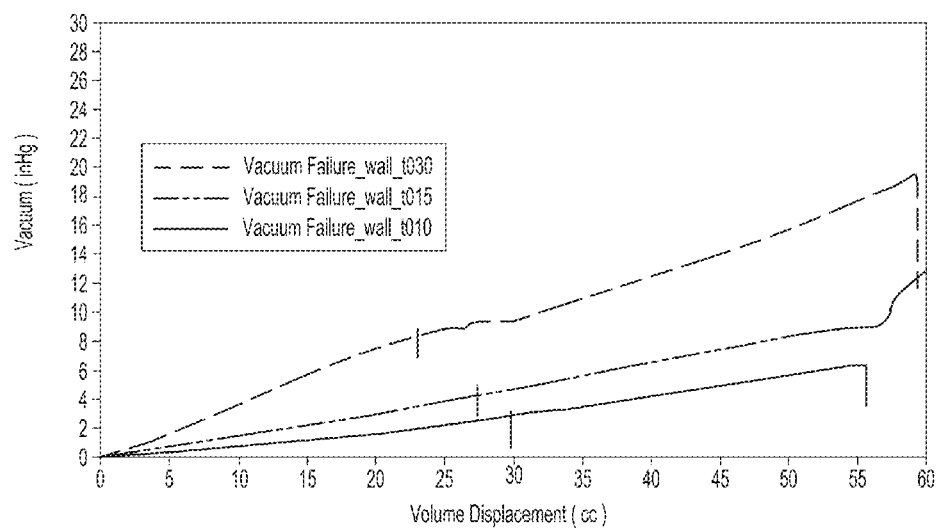
FIG. 7 is a graph illustrating the vacuum response (vacuum (inHg) vs. volume displacement (cc)) of various containers according to the principles of the present teachings having sidewall thicknesses of t010, t015, and t030.
Figure 8A:
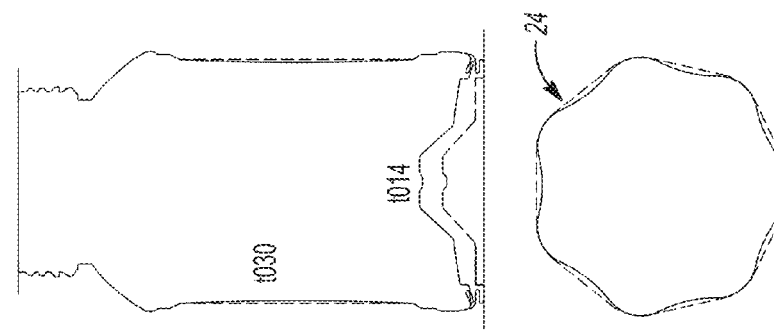
FIGS. 8A-8D are schematic views of the container with portions in dashed lines representing deformation of the container during a vacuum response wherein the base thickness is t014 in each example and sidewall thickness varies from t015, t020, t025, to t030, respectively.
Figure 8B:
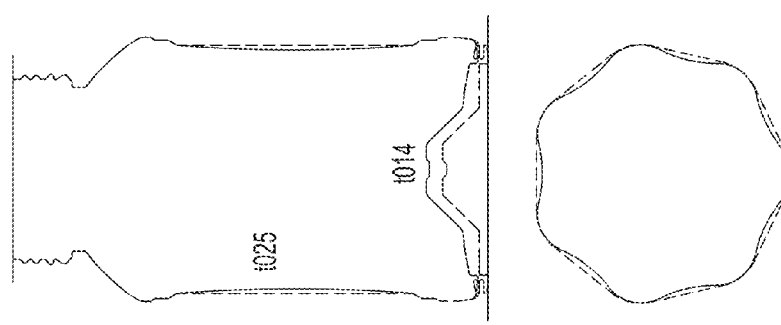
Figure 8C:
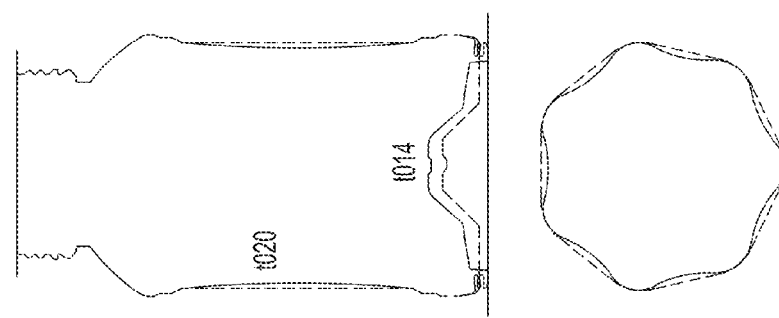
Figure 8D:
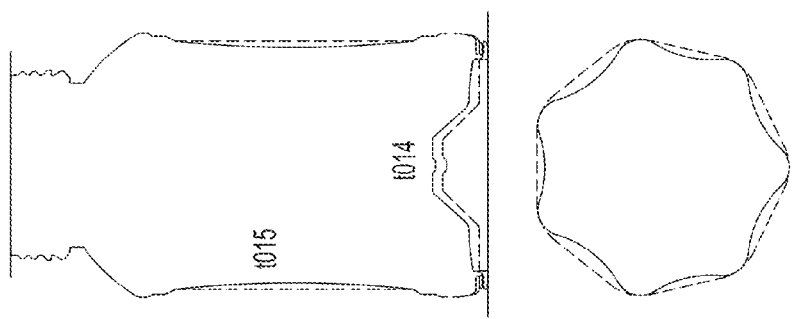
Figure 9G:
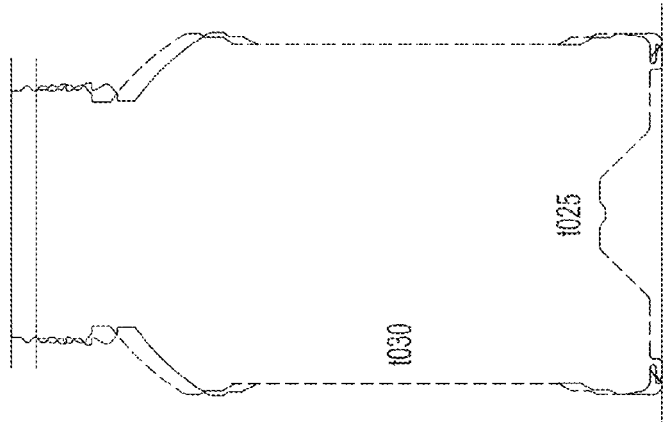
Figure 9H:
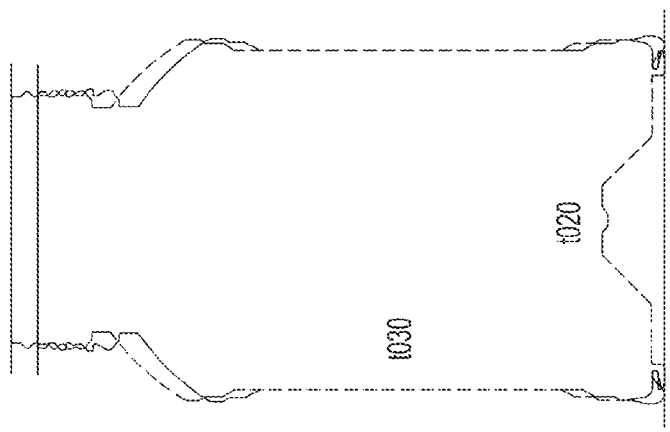
Figure 9I:
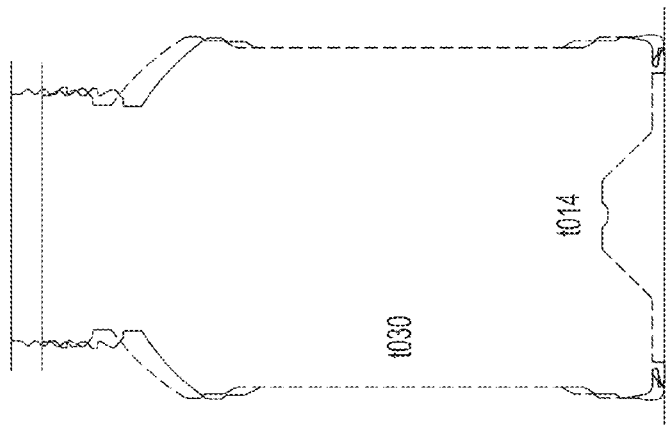

With particular reference to FIGS. 7-10, it should be appreciated that vacuum response of container 10 and flexible standing ring 100 can be dependent on wall thickness of sidewall portion 24, base portion 28, and/or flexible standing ring 100. In this regard, vacuum response of container 10 of FIGS. 5 and 6 is illustrated in FIG. 7, whereby a thickness of center pushup 50 is maintained throughout the several wall thickness variations. Specifically, FIG. 7 illustrates that container 10, having a wall thickness of t030 provides increased resistance to vacuum deformation (in other words, greater vacuum was necessary to achieve a particular volume displacement) compared to thinner wall configurations. Similar vacuum response deformation is illustrated in FIGS. 8 and 9, wherein the thickness of center pushup 50 is maintained (t014) while a thickness of sidewall portion 24 varies from t015, t020, t025, to t030.

Figure 10:
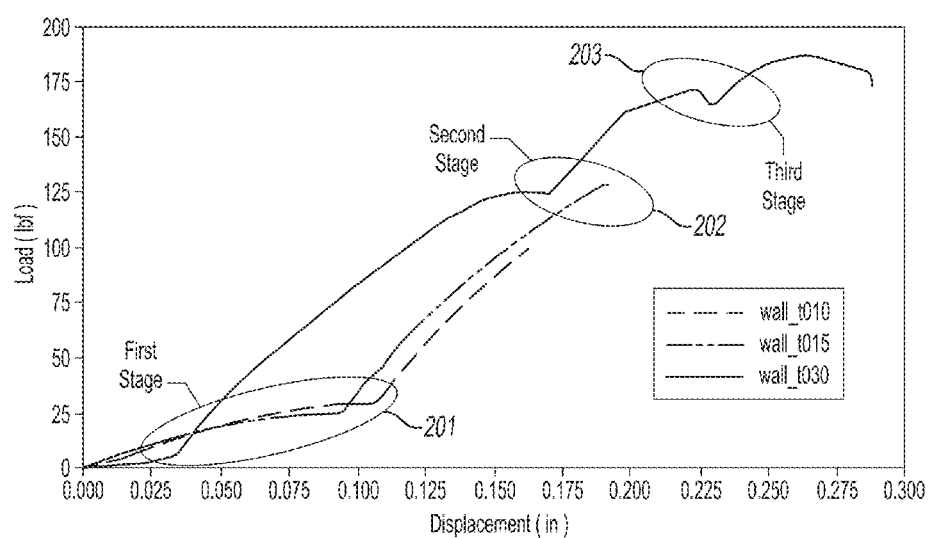
FIG. 10 is a graph illustrating the cap top load response for containers each having a base thickness of t014 and varying sidewall thicknesses of t010, t015, and t030.

Turning now to FIGS. 9A-9I, top loading response can be seen for three variations of container 10 of FIGS. 5 and 6 each having identical thickness of sidewall portion 24 and varying thickness of base portion 28, specifically t014, t020, and t025, and filled with a commodity and capped. The downward force is placed on top of container 10 and generally exerted along axis A-A. Each set of three figures (i.e. 9A-9C, 9D-9F, and 9G-9I) represents a different stage of container deformation. Specifically, the first stage (FIGS. 9A-9C) illustrates the container deformation response where an underside slope of base 30 changes in response to a first contact between a corner 120 of base portion 28 and foot portion 104 and deformation of flexible standing ring 100. A second stage (FIGS. 9D-9F) illustrates the container deformation response where an underside slope of base 30 changes in response to contact between corner 120 of base portion 28 and the support surface upon which container 10 rests—that is, corner 120 passing beyond foot portion 104, and contacting the support surface and the deformed flexible standing ring 100. Finally, a third stage (FIGS. 9G-9I) illustrates the container deformation response where container 10 further contacts the support surface. A similar graph of filled and capped top load response is illustrated in FIG. 10 for the container of FIGS. 5 and 6 wherein center pushup 50 has a constant wall thickness (t014) and varying thicknesses of sidewall portion 24 are presented (t010, t015, t030). As can be seen in FIG. 10, the first stage is denoted at region 201, the second stage is denoted at region 202, and the third stage is denoted at region 203.

According to the foregoing, it should be appreciated that flexible standing ring 100 provides, in part, volume displacement for purposes of vacuum reduction. Specifically, as seen in FIG. 2, the amount of volume displacement can be calculated by multiplying the radius R1 of container 10 by the height H1 of annular groove 112 and Pi. This amount of volume displacement is significant in terms of alternative volume displacement strategies commonly used in container design without the need to account for equivalent fluid displacement.

The plastic container 10 has been designed to retain a commodity. The commodity may be in any form such as a solid or semi-solid product. In one example, a commodity may be introduced into the container during a thermal process, typically a hot-fill process. For hot-fill bottling applications, bottlers generally fill the container 10 with a product at an elevated temperature between approximately 155° F. to 205° F. (approximately 68° C. to 96° C.) and seal the container 10 with a closure (not illustrated) before cooling. In addition, the plastic container 10 may be suitable for other high-temperature pasteurization or retort filling processes or other thermal processes as well. In another example, the commodity may be introduced into the container under ambient temperatures.

The plastic container 10 of the present disclosure is a blow molded, biaxially oriented container with a unitary construction from a single or multi-layer material. A well-known stretch-molding, heat-setting process for making the one-piece plastic container 10 can be used that generally involves the manufacture of a preform (not shown) of a polyester material, such as polyethylene terephthalate (PET), having a shape well known to those skilled in the art similar to a test-tube with a generally cylindrical cross section. An exemplary method of manufacturing the plastic container 10 will be described in greater detail later.

An exemplary method of forming the container 10 will be described. A preform version of container 10 includes a support ring 51, which may be used to carry or orient the preform through and at various stages of manufacture. For example, the preform may be carried by the support ring 51, the support ring 51 may be used to aid in positioning the preform in a mold cavity, or the support ring 51 may be used to carry an intermediate container once molded. At the outset, the preform may be placed into the mold cavity such that the support ring 51 is captured at an upper end of the mold cavity. In general, the mold cavity has an interior surface corresponding to a desired outer profile of the blown container. More specifically, the mold cavity according to the present teachings defines a body forming region, an optional moil forming region and an optional opening forming region. Once the resultant structure, hereinafter referred to as an intermediate container, has been formed, any moil created by the moil forming region may be severed and discarded. It should be appreciated that the use of a moil forming region and/or opening forming region are not necessarily in all forming methods.

In one example, a machine (not illustrated) places the preform heated to a temperature between approximately 190° F. to 250° F. (approximately 88° C. to 121° C.) into the mold cavity. The mold cavity may be heated to a temperature between approximately 250° F. to 350° F. (approximately 121° C. to 177° C.). A stretch rod apparatus (not illustrated) stretches or extends the heated preform within the mold cavity to a length approximately that of the intermediate container thereby molecularly orienting the polyester material in an axial direction generally corresponding with the central longitudinal axis A-A of the container 10. While the stretch rod extends the preform, air having a pressure between 300 PSI to 600 PSI (2.07 MPa to 4.14 MPa) assists in extending the preform in the axial direction and in expanding the preform in a circumferential or hoop direction thereby substantially conforming the polyester material to the shape of the mold cavity and further molecularly orienting the polyester material in a direction generally perpendicular to the axial direction, thus establishing the biaxial molecular orientation of the polyester material in most of the intermediate container. The pressurized air holds the mostly biaxial molecularly oriented polyester material against the mold cavity for a period of approximately two (2) to five (5) seconds before removal of the intermediate container from the mold cavity. This process is known as heat setting and results in a heat-resistant container suitable for filling with a product at high temperatures.

Alternatively, other manufacturing methods, such as for example, extrusion blow molding, one step injection stretch blow molding and injection blow molding, using other conventional materials including, for example, high density polyethylene, polypropylene, polyethylene naphthalate (PEN), a PET/PEN blend or copolymer, and various multi-layer structures may be suitable for the manufacture of plastic container 10. Those having ordinary skill in the art will readily know and understand plastic container manufacturing method alternatives.

It should be appreciated that additional manufacturing processes can be used. For example, when blow molding bottles with inset handles and when forming either a Champaign or PowerFlex base, the molding process has often included the movement of the base mechanism of the mold machine, wherein the base is inserted into the bottle after the container has been formed. This action of retracting the base mechanism of the mold during manufacturing has generally been referred to as "Over-Stroke". It has been found that the delayed timing of this action has resulted in the formation of a standing ring in the form of molding flash. In many applications, this molding flash is undesirable. However, as set forth herein, it should be appreciated that this molding flash can be used to form a standing ring for improved heel (or foot) stability. In many conventional applications, this flash has been uncontrolled resulting in an unstable and uneven platform on the container. However, according to the principles of the present teachings, this flash can be more closely controlled to define an even or flat surface.

Figure 11A:
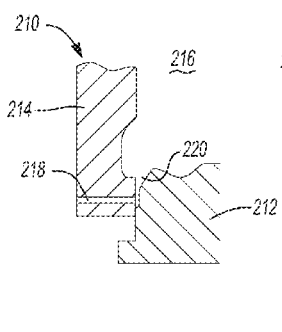
FIGS. 11A and 11B are schematic views of a mold for forming the container of the present teachings shown in a retracted position (FIG. 11A) and an extended position (FIG. 11B)
Figure 11B:
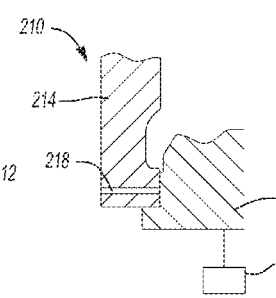
Figure 11C:
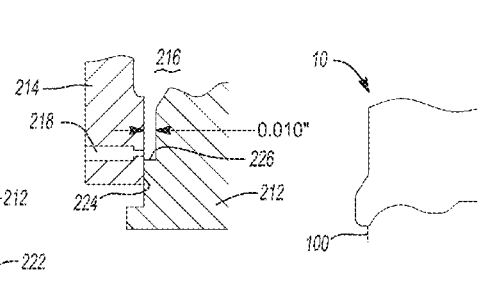
FIG. 11C is a schematic view, similar to FIG. 11A, illustrating the positive stop of the mold.

With particular reference to FIGS. 11A-11C, a portion of a mold 210 according to the principles of the present teachings is illustrated. Mold 210, in some embodiments, is an over-stroke type mold having a first mold portion 212 and a second mold portion 214 that are movable relative to each other. It should be noted that first mold portion 212 can be movable or stationary and, likewise, second mold portion 214 can be stationary or movable, respectively. At least in part, first mold portion 212 and second mold portion 214 together define an internal mold cavity 216 having a contour generally following a final or intermediate contour shape of container 10. Second mold portion 214 can comprise a vent channel 218 extending therethrough and in fluid communication with mold cavity 216. More particularly, in some embodiments, vent channel 218 is positioned adjacent a vented slot portion 220 of mold cavity 216 that is sized and shaped to form standing ring 100.

Figure 11D:
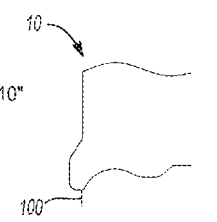
FIG. 11D is a schematic view of a container formed in the mold of FIGS. 11A-11C.

In a first position of first mold portion 212 (e.g. retracted in FIG. 11A), fluid communication is established between mold cavity 216 and vent channel 218 such that molten plastic is free to flow down and/or be blown down into vented slot portion 220. In some embodiments, molten plastic can be molded in such a way that it does not initially contact the metallic portions of mold cavity 216. However, first mold portion 212 can then be actuated via schematically illustrated drive device 222 and positioned in a second position (e.g. extended upward into mold cavity 216 in FIG. 11B). In this way, the act of raising the first mold portion 212, that can define a zero tolerance bearing surface 224 (FIG. 11C) with a positive stop 226 (FIG. 11C), generally defining a flat surface, serves to urge or otherwise mold the material within vent channel 218 into a predetermined standing ring shape. Accordingly, as illustrated in FIG. 11D, a container 10 having a standing ring 100.

In some embodiments, formation of the standing ring can be accomplished using at least two different methods. The first method is the aforementioned Over-Stroke mechanism that can be used to form a thin, generally upstanding, standing ring. Wherein the second method can include the method described herein to form a broader flat surface. Using the Over-Stroke mechanism, it is desirable to incorporate a base design having a positive stop.

Figure 12A:
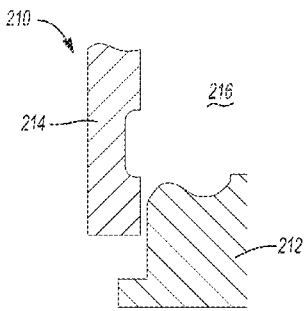
FIGS. 12A and 12B are schematic views of a mold for forming the container of the present teachings shown in a retracted position (FIG. 12A) and an extended position (FIG. 12B)
Figure 12B:
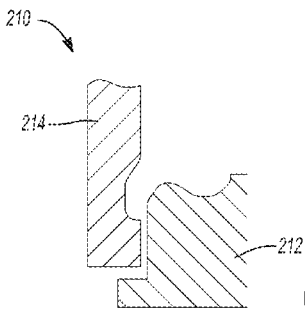
Figures 12C, 12D:
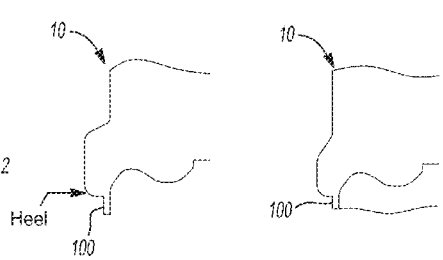
FIG. 12C is a schematic view of a container formed in the mold of FIGS. 12A-12B having a positive stop.
FIG. 12D is a schematic view of a container formed in the mold of FIGS. 12A-12B not having a positive stop.

With particular reference to FIGS. 12A-12D, alternative methods and molds can be used for forming standing ring 100. In some embodiments, as illustrated in FIGS. 12A-12B, generally first mold portion 212 is movable relative to second mold portion 214 between a retracted position (FIG. 12A) and an extended position (FIG. 12B). The first mold portion 212 and the second mold portion 214 can together define a positive stop or no positive stop such that the resultant container 10 can include a generally flat or edge shaped standing ring 100 (see FIG. 12C) or a standing ring 100 having a generally inconsistent defined edge (see FIG. 12D).

Figure 13A:
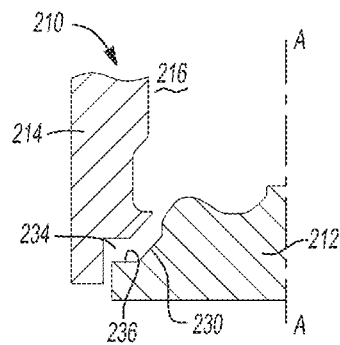
FIGS. 13A and 13B are schematic views of a mold for forming the container of the present teachings shown in a retracted position (FIG. 13A) and an extended position (FIG. 13B) having a tapered standing ring slot.
Figure 13B:
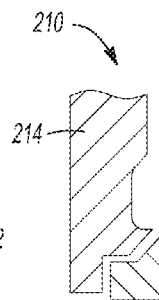
Figure 13C:
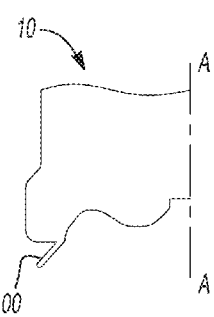
FIG. 13C is a schematic view of a container formed in the mold of FIGS. 13A-13B.

In some embodiments as illustrated in FIGS. 13A-13C, standing ring 100 can be generally tapered. This tapered shape can be defined by forming a tapered slot 230 between first mold portion 212 and second mold portion 214. More particularly, in some embodiments, tapered slot 230 can comprise a first tapered portion 232 extending from mold cavity 216 defining an angle relative to a longitudinal axis A-A of the mold cavity 216. In some embodiments, tapered slot 230 comprises a second tapered portion 234 extending from first tapered portion 232. More particularly, second tapered portion 234 can define an angle generally perpendicular to longitudinal axis A-A. However, alternative angles can be used. In this way, second tapered portion 232 can define a positive stop (e.g. ledge) 236 that can be used to form a truncated or otherwise shaped standing ring 100 (see FIG. 13C).

Figure 14A:
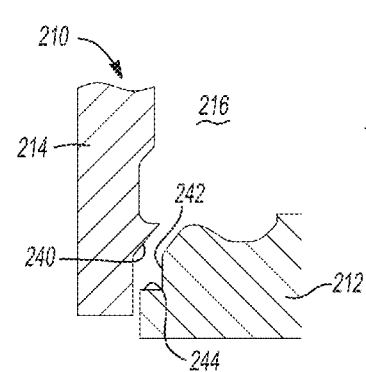
FIGS. 14A and 14B are schematic views of a mold for forming the container of the present teachings shown in a retracted position (FIG. 14A) and an extended position (FIG. 14B) having a triangular standing ring slot.
Figure 14B:
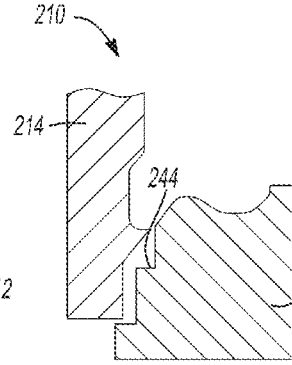
Figure 14C:
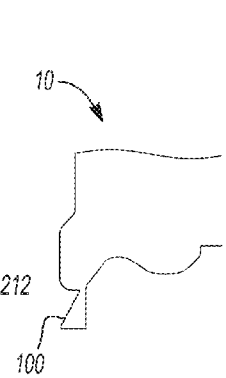
FIG. 14C is a schematic view of a container formed in the mold of FIGS. 14A-14B.

It should be recognized that alternative shapes of standing ring 100 can be formed, such as a generally triangular shaped standing ring 100 as illustrated in FIG. 14C. The generally triangular shaped standing ring 100 can be formed by shaping slot 230 such that it defines an angled surface 240 extending from second mold portion 214 and generally right-angled surfaces 242, 244 formed in first mold portion 212. In this way, right-angled surfaces 242, 244 can define a positive stop (also indicated at 244).

Figure 15A:
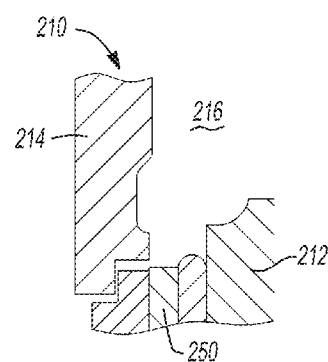
FIGS. 15A and 15B are schematic views of a mold for forming the container of the present teachings shown in a retracted position (FIG. 15A) and an extended position (FIG. 15B) having an adjustably-sized standing ring slot.
Figure 15B:
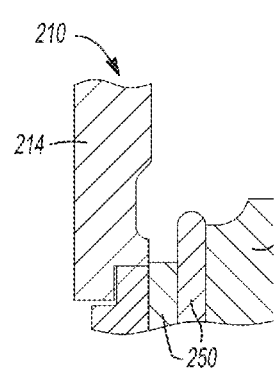
Figure 15C:
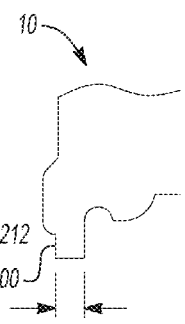
FIG. 15C is a schematic view of a container formed in the mold of FIGS. 15A-15B.

Finally, with reference to FIGS. 15A-15C, in some embodiments, the shape of the resultant standing ring 100 can be varied by using one or more insertable rings or other members 250 within first mold portion 212 (or adjacent first mold portion 212). In this way, the overall width, depth, and/or shape of standing ring 100 can be easily changed.

It should be appreciated from the foregoing that some of the advantages of the standing ring would include standing stability and improved strength. According to the principles of the present teachings, in some embodiments, the methods described herein and illustrated would allow the preform to be blown into a positive stop before the mechanism is raised into its final position. The raising of the mechanism would squeeze the still pliable material to be formed into the standing ring.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A mold for forming a plastic container having an integrally formed standing ring, said mold comprising:
   a first mold portion;
   a second mold portion movable relative to said first mold portion, said first mold portion and said second mold portion together defining at least in part a mold cavity for molding a plastic container; and
   a vent slot extending through said second mold portion, said vent slot being in fluid communication with said mold cavity when said second mold portion is in a first position relative to said first mold portion, said vent slot being fluidly separated from said mold cavity when said second mold portion is in a second position relative to said first mold portion;
   wherein said first mold portion and said second mold portion together define a standing ring slot for forming a standing ring on a base portion of the plastic container, said standing ring slot being defined at an interface between said first mold portion and said second mold portion.

2. The mold according to claim 1, further comprising:
   a positive stop extending from at least one of said first mold portion and said second mold portion, said positive stop forming a predetermined edge along a distal end of the standing ring.

3. The mold according to claim 1 wherein said standing ring slot is adjustable.

4. The mold according to claim 1 wherein said standing ring slot is adjustable in response to the addition of insert rings between at least a portion of said first mold portion and said second mold portion.

5. The mold according to claim 1 wherein said standing ring slot is oriented at an angle greater than 0° and less than 90° relative to a longitudinal axis of said mold cavity.

6. The mold according to claim 1, wherein the mold is configured to form the standing ring as a molding flash including a flat standing surface.

7. The mold according to claim 1, wherein the mold is configured such that relative movement between the first mold portion and the second mold portion forms the standing ring as a molding flash including an even standing surface.

8. The mold according to claim 1, wherein the mold is configured such that relative movement between the first mold portion and the second mold portion forms the standing ring as a molding flash including at least one of a stable heel and a stable foot.

9. The mold according to claim 1, wherein the standing ring slot is configured to form the standing ring as a thin, generally upstanding, standing ring.

10. The mold according to claim 1, further comprising a positive stop extending from at least one of the first mold portion and the second mold portion, the positive stop configured to form the standing ring as a truncated standing ring.

11. The mold according to claim 1, further comprising a positive stop extending from at least one of the first mold portion and the second mold portion, the positive stop configured to shape the standing ring.

12. The mold according to claim 1, wherein the mold is configured to form the standing ring with a strength sufficient to support the plastic container upright.

13. A mold for forming a plastic container having an integrally formed standing ring, the mold comprising:
   a first mold portion;
   a second mold portion;
   a drive device configured to move the first mold portion relative to the second mold portion; and
   a standing ring slot defined between the first mold portion and the second mold portion, the standing ring slot configured to form the standing ring at a base portion of the plastic container;
   wherein the standing ring slot is adjustable to provide the standing ring with different shapes.

14. The mold of claim 13, wherein the mold is configured to form the standing ring as a molding flash including a flat standing surface.

15. The mold of claim 13, wherein the mold is configured such that movement of the first mold portion relative to the second mold portion forms the standing ring as a molding flash including at least one of a stable heel and a stable foot.

16. The mold of claim 13, wherein the standing ring slot is configured to form the standing ring as a thin, generally upstanding, standing ring.

17. The mold of claim 13, further comprising a positive stop extending from at least one of the first mold portion and the second mold portion, the positive stop configured to form the standing ring as a truncated standing ring.

18. The mold of claim 13, further comprising a positive stop extending from at least one of the first mold portion and the second mold portion, the positive stop configured to shape the standing ring.

19. The mold of claim 13, wherein the mold is configured to form the standing ring with a strength sufficient to support the plastic container upright.

20. The mold of claim 13, further comprising a vent slot extending through said second mold portion, said vent slot in fluid communication with said mold cavity when said first and second mold portions are in a first position relative to each other, and said vent slot is fluidly separated from said mold cavity when said first and second mold portions are in a second position relative to each other.

21. A mold for forming a plastic container having an integrally formed standing ring, said mold comprising:
   a first mold portion; and
   a second mold portion movable relative to said first mold portion, said first mold portion and said second mold portion together defining at least in part a mold cavity for molding a plastic container;
   wherein said first mold portion and said second mold portion together define a standing ring slot for forming a standing ring on a base portion of the plastic container, said standing ring slot being defined at an interface between said first mold portion and said second mold portion; and
   wherein said standing ring slot is adjustable.

22. The mold of claim 21, wherein said standing ring slot is adjustable in response to the addition of insert rings between at least a portion of said first mold portion and said second mold portion.

23. A mold for forming a plastic container having an integrally formed standing ring, the mold comprising:
   a first mold portion;
   a second mold portion;
   a drive device configured to move the first mold portion relative to the second mold portion;
   a standing ring slot defined between the first mold portion and the second mold portion, the standing ring slot configured to form the standing ring at a base portion of the plastic container; and
   a vent slot extending through said second mold portion, said vent slot in fluid communication with said mold cavity when said first and second mold portions are in a first position relative to each other, and said vent slot is fluidly separated from said mold cavity when said first and second mold portions are in a second position relative to each other.

* * * * *